Feb. 6, 1962 R. K. SMITH 3,020,099
RAILWAY CAR JOURNAL BEARING
Filed Dec. 7, 1959 2 Sheets-Sheet 2
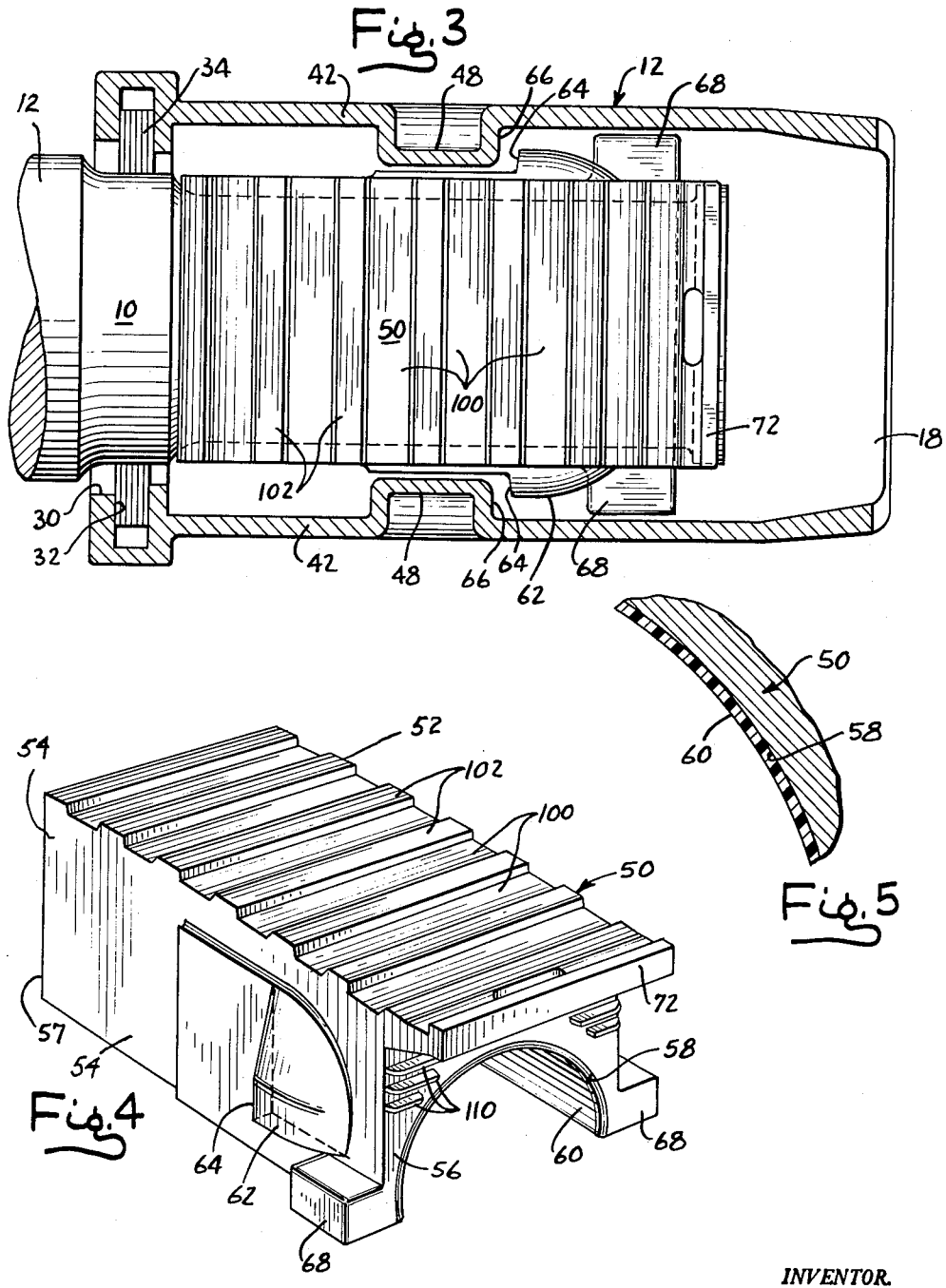
INVENTOR.
RAYMOND K. SMITH
BY
ATTY.

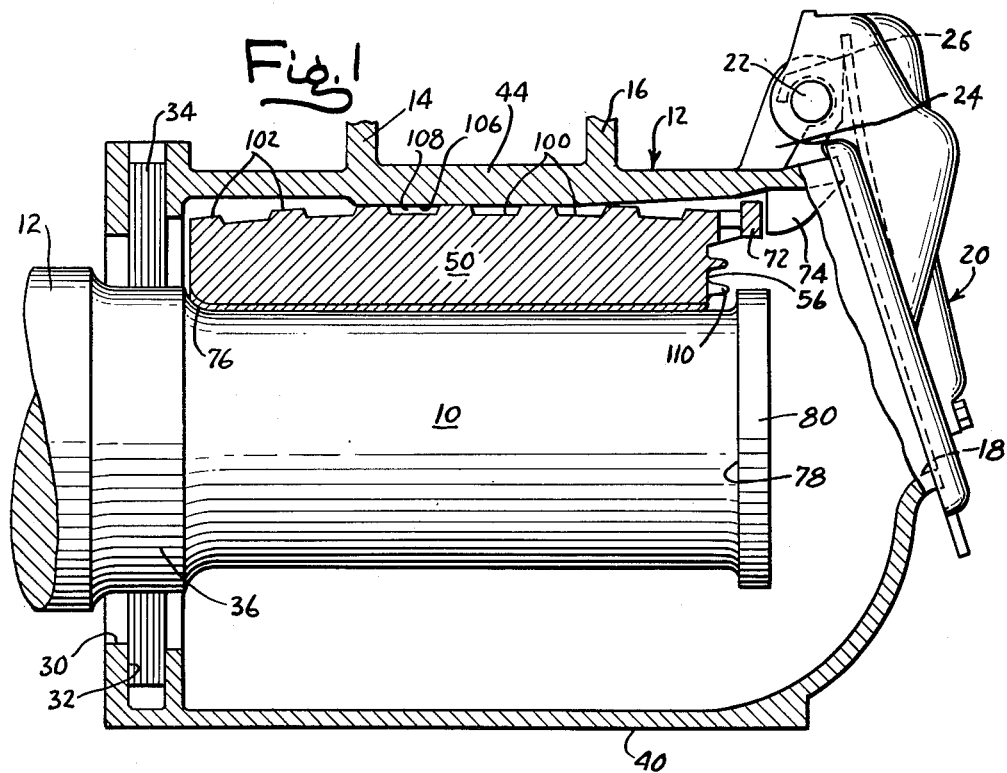
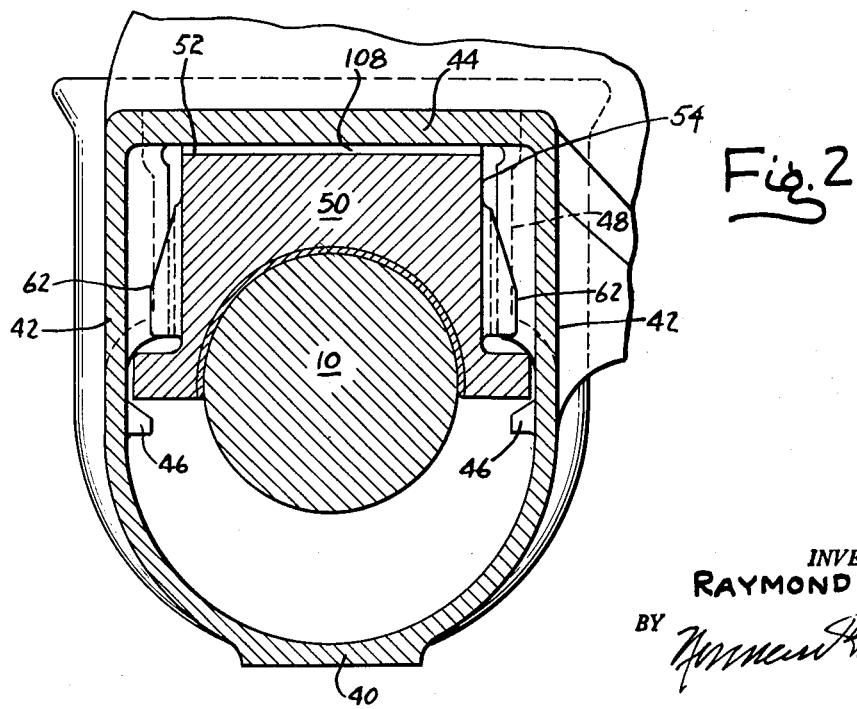

United States Patent Office 3,020,099
Patented Feb. 6, 1962

3,020,099
RAILWAY CAR JOURNAL BEARING
Raymond K. Smith, Joliet, Ill., assignor to Klasing Hand Brake Co., Joliet, Ill., a corporation of Illinois
Filed Dec. 7, 1959, Ser. No. 857,801
2 Claims. (Cl. 308—56)

The present invention relates to railway car journal bearings and has particular reference to a novel form of one-piece metal bearing assembly designed for use within a conventional railway car journal box.

The development of excessive heat in railway car journal boxes has always been a problem that must be contended with, an overheated bearing creating a condition known as a hot-box and usually resulting in damage to the bearing proper or to the journal. Such hot-boxes invariably result in delays in train operation and occasionally expensive derailments and wrecks.

The causes of an overheated bearing are manifold, most of them being occasioned by insufficient lubrication of the journal and the bearing assembly immediately thereabove. When, for any reason whatsoever, insufficient lubricant is applied to the journal, as for example when strands of cotton waste or other foreign material are carried into the space existing between the journal and its overlying bearing incident to rotation of the journal, portions of the journal are wiped clean of the lubricant and excessive heat develops in the small annulus existing between the journal and the bearing or between the journal and the babbitt liner associated with the bearing proper. Such heat is cumulative in that the bearing and any babbitt liner that may be associated therewith have relatively poor heat dissipating qualities, the bearing almost invariably being formed of brass.

Not only is the accumulation of heat within the bearing a function of the poor heat-dissipating qualities of the material of the bearing, but additionally there is an effective barrier to the passage of heat out of the bearing and into the steel wedge which usually overlies the bearing member and serves to support the top wall of the journal box. This barrier to the transfer of heat from the bearing member to the wedge is in the form of an extremely small air gap or space which, small as it may be, nevertheless effectively blocks the free transfer of heat from the former member to the latter. Additionally, the wedge member itself is similarly thermally insulated from the top wall of the journal box by an additional air gap, the extent of this latter gap being appreciable due to the fact that the wedge member is not flush with the inside face of the top wall of the journal box throughout its entire extent. The prevention of hot-boxes is thus dependent almost entirely upon the ability of the journal bearing assembly, including the bearing proper, the babbitt liner and the wedge member, to rid itself of heat by radiation rather than by conduction from the babbitt liner through the brass bearing and steel wedge to the journal box top wall. Unless the the bearing is capable of thus dissipating heat by radiation at a rate faster than heat is generated between it and the rotating journal, a hot-box will invariably occur. This frequently is the cause when foreign material is entrained between the journal and the bearing or its liner.

The present invention is designed to overcome the above-noted limitations that are attendant upon the construction and use of conventional two-piece bearing assemblies for railway car journals and, toward this end, it is contemplated that the bearing member and wedge be integrally formed or cast and made of a metal such as aluminum or metal alloy having high heat-dissipating qualities. Additionally, the invention further contemplates the provision of a series of cooling fins on the bearing member, such fins not only serving to very materially increase the exposed surface area of the bearing member for a more effective discharge of heat by radiation, but also serving, in combination with the underneath surface of the top wall of the journal box, to establish a series of air channels or conduits which extend completely across the bearing member from one side region of the journal box chamber to the other side region thereof, so that an appreciable amount of heat may be dissipated from the bearing by convection as well as by radiation.

Heretofore, where separate bearing and wedge members have been employed, it has been customary to form the bearing member of brass and the wedge member of steel. Since, according to the present invention, these members are cast integrally so that only one member results, this member being formed of light weight aluminum alloy, it may be considered that the wedge member has, in effect, been eliminated. However, such elimination of the wedge member or its integral formation with the bearing member completely eliminates the aforementioned air gap or barrier which formerly existed between the two parts and also eliminates the bi-metallic conductive heat path from the rotating journal to the top wall of the journal box and establishes a more effective thermally conductive path directly from the journal to the top wall of the journal box. This direct path for heat flow, in combination with increased surface area for the single bearing member, very materially enhances the heat-dissipating characteristics of the bearing member over conventional two-piece bearing constructions.

According to the present invention, further dissipation of heat from the single bearing is made possible by forming the liner of nylon instead of the usual babbitt. Nylon possesses good heat absorption characteristics and it oxidizes at approximately 300° F. Furthermore, it is possible to obtain a more intimate contact between the opposed surfaces of the liner and its adjacent bearing so that by making the liner extremely thin, little heat will accumulate within the liner since it is conducted to the bearing almost as soon as it is generated. From the bearing member such heat is rapidly dissipated by radiation and also by conduction to the top wall of the journal box so that the liner will continue to function under conditions of heat generation that ordinarily would destroy the conventional babbitt liner which, due to a small air gap, is effectively heat insulated from its adjacent brass bearing member.

Apart from the advantageous lubricating and heat-dissipating features of the present invention, certain mechanical difficulties encountered in connection with journal box construction have been overcome. It is conventional practice in journal box construction to provide a pair of bronze journal stops on the vertical side walls of the journal box. These stops are designed for contact with the sides of the rotating journal to limit the extent of side sway of the journal within the journal box. It frequently happens that accelerating and decelerating impact forces such as the impacts of coupling shock, pressure of a single brake shoe on a wheel and the like, will cause axial misalignment between the journal box and the journal. This axial misalignment may cause the dust guard to run off its bearing surface or cause the inner end region of the bearing member or its liner to ride upwardly on the filleted surface adjacent the dust guard bearing. It may also cause the end collar on the axle to engage the outer end of the bearing or its liner. In any of these contingencies, damage to the journal or its bearing parts is likely to occur. As stated above, it is conventional practice in journal box construction to provide a pair of bronze journal stops on the vertical side walls of the journal box. These stops are designed for engagement with the opposite sides of the rotating journal to limit the extent of such axial misalignment between the journal and the journal box. Invariably such bronze journal stops are applied to the side walls of the journal box by drilling a pair of holes in the side walls and bolting or riveting the stops in position in the holes, utilizing the latter as anchoring media. This practice is not in accord with recent A.A.R. standards which dictate that the journal box side walls shall be imperforate. Additionally, the use of removable journal stops on the journal box side walls internally thereof leads to difficulties in installation and replacement.

The present invention further contemplates the provision of a novel means for preventing journal and journal box misalignment and, accordingly, it is contemplated that the journal stops be integrally cast on the single journal bearing member in such a manner that they will cooperate with the journal box side walls, not only to prevent journal misalignment, but also to effect additional heat dissipation from the bearing member.

The provision of a railway car journal bearing of unitary construction possessing the novel characteristics and advantageous features briefly outlined above being among the principal objects of the invention, numerous other objects and advantages will become more readily apparent as the following description ensues.

In the accompanying two sheets of drawings forming a part of this specification, a preferred embodiment of the invention has been shown.

In these drawings:

FIG. 1 is a sectional view taken substantially centrally, longitudinally and vertically through a railway car journal box showing the improved one-piece bearing of the present invention operatively installed therein;

FIG. 2 is a sectional view taken substantially along the line 2—2 of FIG. 1;

FIG. 3 is a sectional view taken substantially along the line 3—3 of FIG. 2;

FIG. 4 is a perspective view of the bearing and its liner; and

FIG. 5 is an enlarged sectional view taken substantially along the line 5—5 of FIG. 2.

Referring now to the drawings in detail and in particular to FIGS. 1 and 2, the improved journal bearing assembly of the present invention is shown as being operatively applied to the axle journal 10 of a conventional wheel axle 11 in the journal box 12 of a railway car truck. The journal box selected for illustration herein is of standard construction and is shown as being integrally cast with the end portions 14, 16 of a truck side frame. The journal box 12 is provided with an outer end opening 18 adapted to be closed by the usual hinged journal box lid 20 which is pivotally carried on a pin 22 supported between a pair of lugs 24 formed integral with the journal box casing. Spring means 26 is provided for maintaining the lid 20 in either its fully opened or its fully closed position.

The inner end of the journal box 12 is provided with an opening 30 through which the axle journal 10 projects inwardly of the journal box. The journal box is provided with the usual dust guard slot 32 carrying a dust guard 34 which bears against a dust guard bearing 36 of the axle 11 to preclude dust, dirt or other foreign material from entering the journal box through the opening 30.

As best seen in FIGS. 2 and 3, the journal box 12 is provided with a curved bottom wall 40 which merges with a pair of upstanding vertical side walls 42 which are bridged by a generally flat top wall 44. The side walls 42 are each formed with the usual internal side lugs 46, while the upper regions of these side walls are inwardly offset or recessed as at 48. These recessed portions serving a function in connection with the present journal bearing assembly will be made clear presently.

A journal bearing proper, hereinafter referred to simply as the journal bearing, has been designated in its entirety at 50 and is best illustrated in FIG. 4. This bearing is formed of a suitable metal such as aluminum or of a light-weight metal alloy having high heat dissipating qualities. The bearing 50 is generally in the form of a block of rectangular characteristics and having a generally flat top face 52, vertically generally flat side faces 54, and generally flat front and rear faces 56 and 57 respectively. The underneath side of the bearing presents a concave cylindrical surface 58 within which there is fitted a thin liner 60 of nylon or similar material having good heat absorbing qualities. The curvature of the surface 58 and liner 60 is conformable with the curvature of the cylindrical journal 10.

The side faces 54 of the bearing or block 50 are formed with outstanding stop lugs 62 presenting inwardly facing shoulders 64 designed for cooperation with respective outwardly facing shoulders 66 (FIG. 3) existing by virtue of the inwardly offset or recessed portions 48 of the journal box side walls 42. The side faces 54 are also formed adjacent the outer lower corner regions thereof with lateral journal stop lugs 68 designed for engagement with the inside faces of the journal box side walls 42 when a predetermined degree of axial misalignment of the journal 10 relative to the axis of the journal box is encountered.

The forward or outer edge regions of the bearing member 50 is provided with an extension 72 having an end bearing against a lock shoulder 74 formed integrally on the journal box.

In order to minimize axial movement of the journal 10 relative to the bearing 50, the inner edge region of the bearing is rounded as at 76 (FIG. 1) and follows the flared inner end of the journal 10 where the latter meets the dust guard bearing surface 36, while the forward end face 56 opposes a rearwardly facing shoulder 78 of the end collar 80 which is provided at the extreme outer end of the journal 10. The spacing of these various parts is such as to permit only a limited degree of axial shifting movement of the bearing on the journal.

A series of transversely extending troughs or grooves 100 are provided in the upper face 52 of the bearing 50, these troughs being longitudinally spaced along the bearing and defining therebetween a series of ribs or fins 102. While six such troughs 100 have been illustrated herein, it will be understood that a greater or lesser number of troughs may be provided if desired. The various ribs 102 constitute in effect cooling fins for heat radiating purposes, these fins materially increasing the total or overall surface area of the bearing 50 as a whole. The ribs 102 are provided with flat tops which fit against the underneath side 106 of the top wall 44 of the journal box 12 and establish respective paths for the flow of heat by direct conduction from the bearing 50 into the top wall of the journal box.

The grooves or troughs 100 extend completely across the upper face 52 of the bearing 50 and thus provide openended channels 108 through which air may circulate so that a certain amount of heat is removed from the bearing, by convection, as well as by radiation.

At the forward end face of the bearing 50, additional cooling fins 110 are formed. These include a relatively long fin which extends substantially completely across the end face 56 and a series of smaller fins which are accommodated in the regions of the end face 56 existing between the bearing surface 58 and the vertical side faces 54 of the bearing 50.

From the above description it is believed that the construction and use of the herein described bearing assembly will be readily apparent. It is to be noted at this point that by forming the bearing proper 50 of a light weight metal such as aluminum or an aluminum alloy, not only are the heat dissipating properties of the bearing assembly greatly enhanced, but installation procedure is simplified. In comparison with the usual approximately forty pounds of conventional brass bearing and wedge, the present single bearing has a weight of approximately ten pounds so that it is possible for a single operator to remove it with one hand after the journal box has been elevated in the conventional manner to create the necessary clearance space for removal thereof.

The invention is not to be limited to the exact arrangement of parts shown in the accompanying drawings nor described in this specification, since various changes in the details of construction may be resorted to without departing from the spirit of the invention. For example, while the various air channels or conduits afforded by the grooves 100 have, in the form of the invention selected for illustration, been shown as extending transversely of the bearing 50, it is within the scope of the invention to direct the grooves so that the channels extend diagonally or longitudinally across the upper face of the bearing. Only insofar as the invention has particularly been pointed out in the accompanying claims is the same to be limited.

Having thus described the invention what I claim as new and desire to secure by Letters Patent is:

1. A railway car axle mounting comprising a journal box having a top wall defining a substantially flat downwardly facing bearing seat, and a pair of side walls depending from said top wall, an axle extending between said side walls at a location below the top wall and presenting a journal within the box, and a bearing interposed between said journal and top wall, said bearing comprising a bearing block formed of an aluminum alloy which is light in weight and possesses high heat-dissipating characteristics, said bearing block presenting a semi-cylindrical imperforate bearing surface, and a thin liner of flexible plastic material interposed between said bearing block and journal, said bearing block having a substantially flat upper surface in intimate direct contact with said flat bearing seat, said flat upper surface being interrupted at spaced regions by a series of transversely extending grooves which extend completely across said flat upper surface and which, in combination with said flat downwardly facing seat, define a number of air passages for establishing communication between the opposite side regions of the journal box.

2. A railway car axle mounting comprising a journal box having a top wall defining a substantially flat downwardly facing bearing seat, and a pair of side walls depending from said top wall, an axle extending between said side walls at a location below the top wall and presenting a journal within the box, and a bearing interposed between said journal and top wall, said bearing comprising a bearing block formed of an aluminum alloy which is light in weight and possesses high heat-dissipating characteristics, said bearing block presenting a semi-cylindrical imperforate bearing surface, and a thin liner of flexible plastic material interposed between said bearing block and journal, said bearing block having a substantially flat upper surface in intimate direct contact with said flat bearing seat, and having flat vertical sides, said flat upper surface being interrupted at spaced regions by a series of transversely extending grooves which extend completely across said flat upper surface and which, in combination with said downwardly facing flat bearing seat, define a number of air passages for establishing communication between the opposite side regions of the journal box, the forward face of said bearing block being provided with a series of integral cooling fins thereon, and a journal stop integrally formed on each flat vertical side of said bearing block, said journal stops cooperating with said journal box side walls through the bearing block for limiting the extent of permissible journal misalignment within the journal box.

References Cited in the file of this patent

UNITED STATES PATENTS

| | | |
|---|---|---|
| 1,684,146 | Ripley | Sept. 11, 1928 |
| 2,044,514 | Tatum | June 16, 1936 |
| 2,296,726 | Mohun | Sept. 22, 1942 |
| 2,426,940 | McCullough | Sept. 2, 1947 |
| 2,592,294 | Korn | Apr. 8, 1952 |
| 2,691,554 | Bucher | Oct. 12, 1954 |
| 2,720,119 | Sherman | Oct. 11, 1955 |
| 2,793,918 | Couch | May 28, 1957 |
| 2,906,567 | Runton et al. | Sept. 29, 1959 |